MULTIPLE CARRIER TRANSMISSION SYSTEM

Filed Nov. 27, 1948 2 SHEETS—SHEET 1

INVENTORS: W.R. BENNETT
C.B.H. FELDMAN
BY Harry C. Hart
ATTORNEY

MULTIPLE CARRIER TRANSMISSION SYSTEM

Filed Nov. 27, 1948 2 SHEETS—SHEET 2

INVENTORS: W. R. BENNETT
C. B. H. FELDMAN
BY Harry C. Hart
ATTORNEY

Patented Nov. 20, 1951 2,575,993

UNITED STATES PATENT OFFICE 2,575,993

MULTIPLE CARRIER TRANSMISSION SYSTEM

William R. Bennett and Carl B. H. Feldman, Summit, N. J., assignors to Bell Telephone Laboratories, Incorporated, New York, N. Y., a corporation of New York Application November 27, 1948, Serial No. 62,364

24 Claims. (Cl. 332—40)

Figures 1, 2:
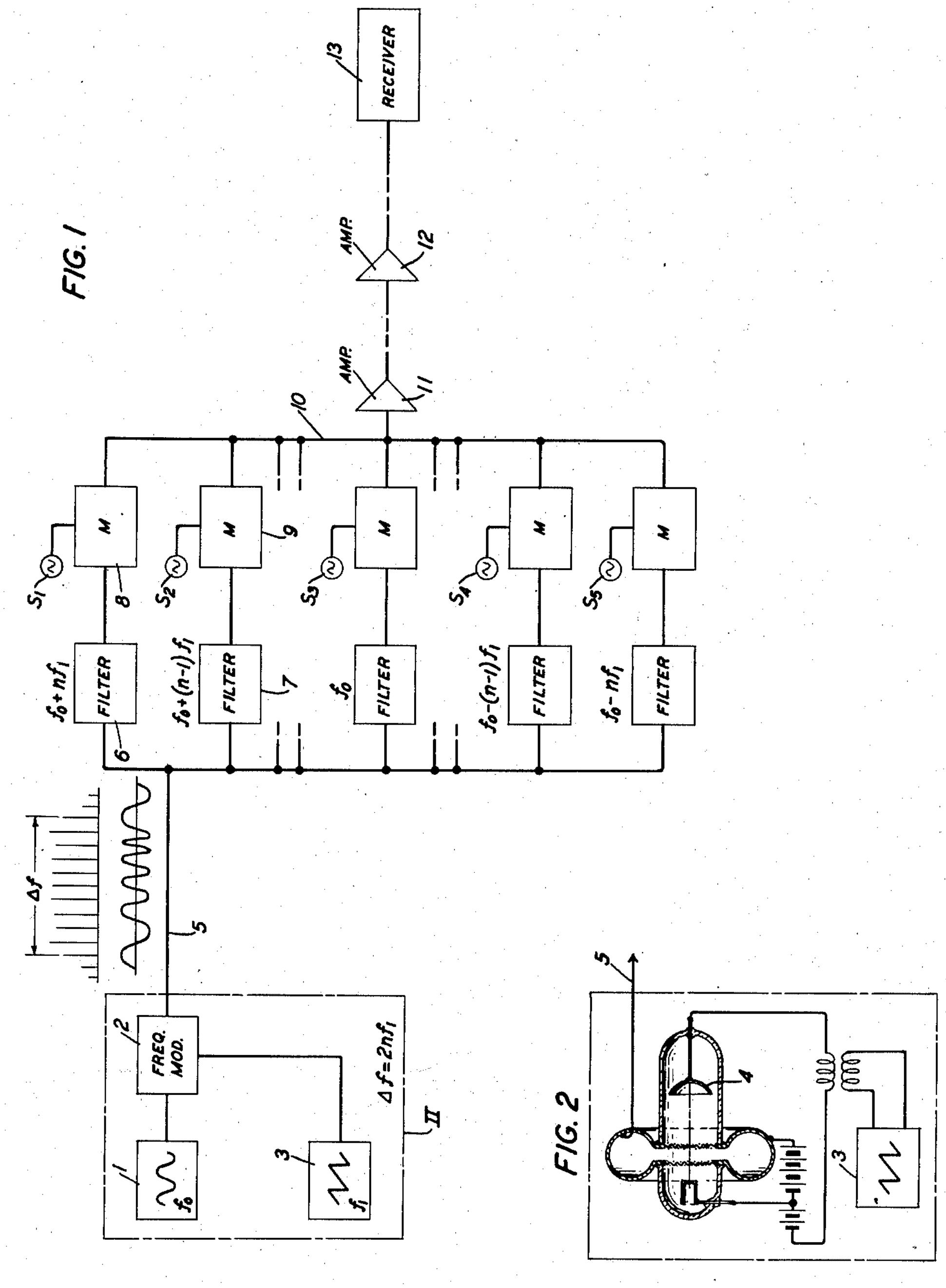

This invention relates to carrier frequency transmission systems and particularly to systems of the frequency division multiplex class.

The principal object of the invention is to reduce the occurrences of conditions of coincidence, or near coincidence, of phase, among adjacent carriers.

A related object is to permit a substantial reduction of the power-handling capacity of broad-band carrier frequency repeaters which amplify or otherwise translate a plurality of adjacent channels.

Another related object is to reduce the stringency of the requirements of isolation or segregation as between physically proximate transmission paths.

Another related object is to permit closer spacing among adjacent carriers than has heretofore been feasible, without risking serious peak interference.

Another object is to generate a group of adjacent carriers which are equally spaced on the frequency scale and whose amplitudes are substantially equal.

In frequency-division multiplex transmission systems, it is usual to generate a group of adjacent carriers as harmonics or submultiples of a common source. This has the advantage that the frequencies of the individual carriers and their spacing on the frequency scale are readily controllable. On the other hand, any such definite frequency relation among the carriers entails a periodically recurring phase relation among them; and if, at any instant, the condition is such that the voltages of a number of the carriers are substantially in phase coincidence, then this condition recurs each full cycle of the fundamental frequency of which the several carriers are harmonics; and on each such occurrence the total carrier voltage in apparatus which translates them in common is N times that of each one, where N is the number of carriers, i. e., many times as great as the root mean square value. By the same token, the corresponding power is $N^2$ times the power of a single carrier. Such conditions impose requirements on common transmission apparatus that it shall be capable of handling the voltage excursion and the power which occur during the phase coincidence, as well as the much smaller voltage and power which occur at other times. A voltage peak which exceeds the capabilities of common transmission apparatus produces cross-modulation and thereby causes interchannel interference. Even in a system designed to transmit a large peak voltage without distortion, the presence of such a peak may still cause objectionable disturbances in other transmission systems operating in the same frequency range over nominally independent circuits which are nevertheless in close physical proximity, since a small amount of inductive or capacitive coupling between these circuits exposes them to linear crosstalk of peak amplitude directly proportional to the peak voltage of the multichannel carrier wave. The term "interference" is employed in this specification to include disturbances produced either by cross-modulation or by linear crosstalk, and the term "peak interference" will then designate the value of such interference which occurs when the multichannel carrier wave reaches its peak. Reduction of the size of the multichannel peak voltage results in a reduction of the peak interference.

In Heising Patent 2,028,212 a system is described by which it is sought to circumvent this difficulty by individually adjusting the phases of the several carriers so that they are never in phase coincidence. With such a system, substantial gains are obtained with a comparatively simple departure from exact phase coincidence among all the carriers—for example, by reversal of the phase of any one. But as each further adjustment is made it becomes increasingly difficult to determine whether the next one will improve the results or degrade them. Therefore the preferred phase adjustment of the Heising patent is simply one in which the phases of the several carriers differ as widely as possible from the systematic arrangement in which full phase coincidence recurs regularly. Such a phase distribution is termed a random one in the Heising patent.

The present invention approaches the problem by a different avenue. Instead of first assigning frequencies and then seeking to adjust phases, it proceeds at once to the generation of an overall voltage wave form of which the spectral components are inherently in such phase relations as to minimize peak interferences, and then utilizes each of these separate spectral components as a separate signal carrier. The principal objective is thus met in an effortless fashion. The spacing between these carriers is then separately and independently controlled as desired. Briefly, the objects of the invention are attained in the following manner: A "central" high frequency carrier, which may be a sinusoid, is first frequency-modulated by a wave of lower frequency and of such wave form that the resulting frequency-modulated wave is of constant amplitude and of a frequency which varies linearly with the time over each full cycle of the modulating wave and then returns substantially instantaneously to its initial value. Inasmuch as the envelope of such a wave is of constant amplitude, it is readily seen that any set of components into which it may be resolved are of such phase relations that, when they are added together, extreme excursions of the type which cause intercarrier interference never occur. In other words, the ratio of peak voltage to root mean square voltage is $\sqrt{2}$, the smallest that can be obtained.

Now it happens that the Fourier spectrum of this wave comprises a set of components which, when their number is large, are equally spaced about the central carrier and of amplitudes which are substantially alike up to a certain point on the frequency scale, beyond which they fall off rapidly. The point on the frequency scale which divides the spectrum into two parts, the first of which contains a number of nearly equal components and the second of which contains only components of successively smaller amplitudes, is conveniently taken as the point at which the end components of the sequence on either side of the central carrier are of one half the amplitude of the central carrier. Up to this point the spectrum envelope is substantially rectangular.

The several components within the substantially rectangular portion of the spectrum envelope may now be selected from the frequency modulated wave by a bank of narrow band-pass filters, whereupon they may be treated as individual, equispaced, equiamplitude carriers. Separate signals may be modulated onto them by conventional means and the several carriers as so modulated may be transmitted over a common medium without fear of serious distortion due to interpeak interference.

The spectrum components within the substantially rectangular portion of the spectrum are of exactly equal amplitudes only in the ideal case in which they are very great in number. In a more practical case in which the number of such components is of the order of 10 to 100, individual harmonic components within this portion of the envelope may differ by a few decibels. Furthermore, elimination, by the bank of band-pass filters, of the tapering sequence of spectrum components which lies outside of the substantially rectangular envelope portion tends to modify the corresponding frequency modulated wave, causing it to have a small amount of amplitude modulation in addition to its desired frequency modulation, and so to reduce the practical results obtained below the ideal value. This reduction, however, is not so great as to be serious.

One way of generating the frequency-modulated wave of uniform frequency variation throughout each cycle is to generate, independently, a voltage of sawtooth wave form and apply it as a modulating signal to a frequency modulator whose characteristic is linear. In case a frequency modulator is preferred whose characteristic is not linear, the modulating voltage may be predistorted from sawtooth form to compensate for the departure of the modulator characteristic from linearity.

The high frequency central carrier may itself be a complex wave having substantial harmonic components, in which case, if the characteristic of the modulator is linear, separate spectral groups of components are produced. The first centered on the fundamental frequency of the central carrier, is as described above. The next is similar, but is centered on the second harmonic of the carrier. The third is again similar but is centered on the third harmonic of the carrier. These various groups of components may be kept widely separated on the frequency scale, or they may be caused to substantialy coalesce, as desired, by appropriate control of the modulation index or frequency deviation of the frequency-modulated wave, and of the periodicity of the modulating wave.

Figure 3:
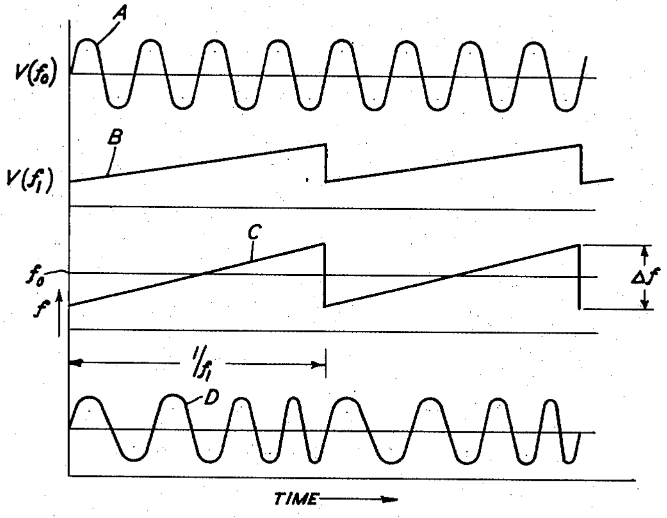
Figure 4:
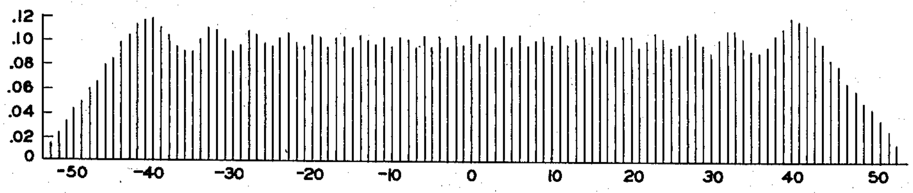
Figure 5:
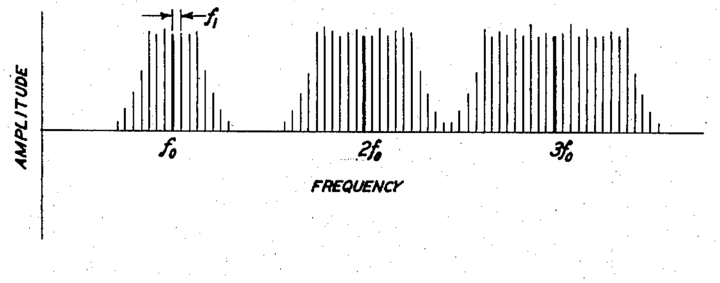

The invention will be fully aprehended from the following detailed description of a preferred embodiment thereof taken in connection with the appended drawings, in which Fig. 1 is a block schematic diagram of one form of transmitter apparatus in accordance with the invention;

Fig. 2 is a schematic circuit diagram of apparatus alternative to that part of Fig. 1 which lies within the box II;

Fig. 3 contains a group of wave form diagrams of assistance in explaining the invention;

Fig. 4 is a plot of the amplitudes of a set of one hundred harmonically related carrier waves generated in accordance with one form of the invention; and Fig. 5 is an illustrative plot of a plurality of separate but related spectra, each similar to that of Fig. 4, generated in accordance with another form of the invention.

Referring to Fig. 1, an oscillator 1 supplies a wave of frequency $f_0$ to a frequency modulator 2. The frequency $f_0$ is chosen in the center of the principal group of carrier frequencies desired. The frequency modulator 2 may be realized in a number of ways; for example, by a standard phase modulating system with integrating circuit in the signal branch for conversion from phase to frequency modulation and a sequence of current limiters and frequency multipliers in the output to enhance the frequency variation. Such modulating arrangements have been described for example by E. H. Armstrong in Proceedings of I. R. E., vol. 24, pages 689–740, May 1936 and R. Alder in "FM," vol. 5, pages 30–31, 68, December 1945. The input to the frequency modulator 2 is a sweep voltage of sawtooth wave form and of frequency $f_r$. It is supplied from a conventional sawtooth sweep generator 3. Instead of a separate oscillator and frequency-modulator, a frequency-modulated oscillator may be used, as shown for instance in Fig. 2, which shows the sawtooth sweep voltage of the generator 3 applied by way of a transformer to the repeller plate 4 of a reflex oscillator tube, such as described for example by J. R. Pierce and W. G. Shepherd in the Bell System Technical Journal, vol. 26, pages 460–680, July 1947. The self-oscillation frequency of such a tube is known to be closely proportional to the potential of the repeller plate 4. Thus the aparatus of Fig. 2 may replace the elements within the box II of Fig. 1. The oscillator could also be of the conventional tuned circuit type with a reactance tube in parallel with the tuning elements, and the frequency control applied to the grid of the reactance tube, as described by J. F. Morrison in Proceedings of the I. R. E., vol. 28, pages 444–449, October 1940. In either case the desired frequency-modulated wave appears on the output line 5.

The output of the frequency modulator 2, Fig. 1, or frequency-modulated oscillator, Fig. 2, is a frequency-modulated wave, of central frequency $f_0$, and of substantially constant amplitude. It is roughly depicted, together with its spectrum, in Fig. 1. It is applied to a group of band-pass filters 6, 7, etc., with input circuits in parallel. These filters are adjusted to have their respective pass-bands differ from each other by the frequency $f_1$. Each filter selects a distinct component frequency for the carrier of the corresponding channel of a conventional frequency-divided multiplex system. Filter 6 selects a component of frequency $f_0+nf_1$, filter 7 a component of frequency $f_0+(n-1)f_1$, and so down to the last filter of the bank, which selects a component of frequency $f_0-nf_1$, giving a total of $2n+1$ separate carriers whose frequencies differ by equal amounts, and whose amplitudes are, at least nominally, alike. These carriers are individually modulated in conventional amplitude modulators 8, 9, etc. by individual signal generators $S_1$, $S_2$, etc. The carriers as thus modulated by the signals may now be combined for transmission over a common medium which may include repeaters 11, 12, etc. To indicate this combination the outputs of the modulators 8, 9, are shown connected in parallel to a common conductor 10. A receiver 13 may include conventional equipment for separating the channels by frequency selectivity and detecting and reproducing the several signals.

In Fig. 3 the curve A shows the wave form out of the oscillator 1 of Fig. 1 for the case of a constant frequency $f_0$. Curve B shows the voltage or current delivered by the sawtooth generator 3 as a function of time. Curve C shows the corresponding frequency variation in the output of the frequency modulator 2 and curve D illustrates the resulting wave form from the modulator 2 as a function of time. The diagrams are drawn for a linear variation of frequency with voltage and a sawtooth modulating wave which is linear with time. Non-linear variations of either quantity can be compensated by a complementary non-linear variation in the other.

The wave selected for illustrating the invention is one in which, as shown in curve D of Fig. 3, the frequency varies linearly, in an upward sense, through the central frequency $f_0$ from a lower value to higher value over a period $$\frac{1}{f_1}$$

then returns suddenly to the lower value and repeats the variation, while remaining of constant amplitude. A frequency sweep which varies linearly downward serves equally well. It can be shown mathematically that the spectrum of such a wave consists of a large number of components which are symmetrically distributed about the central frequency $f_0$, and that a particular group of these, $2n+1$ in number, namely those included in the range $f_0-nf_1$ to $f_0+nf_1$, are of nearly equal amplitudes, all being equal to or greater than one half the amplitude of the central component of the group, while all of the others which lie outside of this range are less than one half of the amplitude of the central component, most of them being very much less. The number $n$ of components included in each half of this spectrum, between the midpoint frequency $f_0$ and the lower half-amplitude frequency $f_0-nf_1$ or the upper half-amplitude frequency $f_0+nf_1$, is given by $$n=\frac{\Delta f}{2f_1}$$

where $\Delta f$ is the amount of the whole frequency sweep from lowest to highest, and $f_1$ is the rate at which the frequency sweep recurs. The sweep period $$\frac{1}{f_1}$$

and the frequency sweep $\Delta f$ are indicated in the curves of Fig. 3, the resulting wave form being shown in the curve D. It can further be shown mathematically that the amplitudes of the components in the range $f_0-nf_1$ to $f_0+nf_1$ are substantially inversely proportional to the square root of their number, namely, $$A_n \sim \frac{1}{\sqrt{2n+1}}$$

This situation is illustrated in the spectrum plot of Fig. 4, for the case in which $n=49$.

In non-mathematical terms, the improvement provided by the invention may be understood to follow from the fact that, with the frequency variation of the invention as depicted in curve D of Fig. 3, the instantaneous frequency of the modulator 2 spends equal fractions of the whole sweep period $$\frac{1}{f_1}$$

at all frequencies in the sweep range. When this range is selected as extending from $f_0-nf_1$ to $f_0+nf_1$, the instantaneous frequency spends equal amounts of time at all of these frequencies, so contributing equal energies to each of the individual filters which are tuned to these frequencies. On the other hand, the instantaneous frequency spends no time at all at frequencies outside of this range, wherefore the spectrum components outside of this range are of low energy content.

When only those components, Fig. 4, of the frequency-modulated wave, curve D of Fig. 3, which lie between the frequency limits $f_0-nf_1$ and $f_0+nf_1$, that is to say within that part of the spectrum, Fig. 4, of which the envelope is substantially rectangular, are utilized as carriers and, after signal modulation, are applied together to a common transmission medium, the resulting wave in the common medium departs, in some measure, from the pure frequency-modulated wave, curve D of Fig. 3. However, because by far the greatest part of the energy of the original wave and of its whole spectrum is contained within the rectangular envelope part of the spectrum, and therefore in the outgoing wave, these departures are not large. As a practical matter, therefore, the peak interference between adjacent carriers is by the present invention reduced to a point at which it is not in any way serious.

If the oscillator 1 of Fig. 1 is itself a sawtooth generator of repetition frequency $f_0$ instead of a source of sinusoidal oscillations, the spectrum of the output of the frequency modulator 2 becomes of the form shown in Fig. 5. The fundamental frequency $f_0$ and each harmonic $2f_0$, $3f_0$, etc. are centers of individual groups of adjacent components. The spacing of the components in each group is $f_1$, but the number of substantially equal components in the group increases with the central frequency. The reason for the increment is that when the fundamental frequency $f_0$ of the oscillator is shifted through a range $\Delta f$, the second harmonic $2f_0$ shifts through the range $2\Delta f$ and in general the $m$th harmonic $mf_0$ shifts through $m\Delta f$. The number of equal amplitude components in the group centered on the harmonic $mf_0$ is therefore given by $2n+1$, where $$2n=\frac{m\Delta f}{f_1}$$

The number is thus proportional to the order of the harmonic about which the group is centered.

It will be noted from Fig. 5 that the increased number of components in the higher frequency group causes the interval between the nearest sizable components in adjacent groups to diminish with increasing central group frequency. Ultimately the separation between groups shrinks to zero and higher adjacent groups overlap. Interference between the components of overlapping groups makes them unsuitable for use as carrier frequencies and hence the frequency swing $\Delta f$ suffered by the fundamental should be made sufficiently small to prevent overlap at the highest group frequency to be used.

What is claimed is:

1. The method of signalling which comprises the steps of generating oscillations of a central high frequency, generating oscillations of sawtooth wave form and of intermediate frequency, frequency-modulating the first oscillations by the second oscillations to provide a resultant frequency-modulated wave characterized by a spectrum comprising a set of equally spaced components of substantially like amplitudes and of intererence-minimizing phases, selecting individual components of said set, and individually modulating each of the several selected components of said spectrum by a signal of lower frequency.

2. The method of signalling which comprises the steps of generating oscillations of a central high frequency, generating oscillations of sawtooth wave form and of intermediate frequency, frequency-modulating the first oscillations by the second oscillations to provide a resultant frequency-modulated wave having a plurality of spectral components, and simultaneously individually modulating some of said components of said spectrum by signals of lower frequency.

3. The method of signalling which comprises the steps of generating oscillations of a central high frequency, generating oscillations of non-sinusoidal wave form and of intermediate frequency, frequency-modulating the first oscillations by the second oscillations to provide a resultant frequency-modulated wave characterized by a spectrum comprising a number of equally spaced components of similar amplitudes and of interference-minimizing phases, and simultaneously individually modulating the several components of said spectrum by signals of lower frequency.

4. The method of signalling which comprises the steps of generating oscillations of a central high frequency, varying the frequency of said oscillations between two values, regularly repeating said variation at an intermediate frequency to provide a resultant frequency-modulated wave characterized by a spectrum comprising a number of equally spaced components of similar amplitudes and of interference-minimizing phases, and simultaneously individually modulating at least some of the several components of said spectrum by signals of lower frequency.

5. The method of signalling which comprises the steps of generating oscillations of a central high frequency, varying the frequency of said oscillations linearly between two values, regularly repeating said variation at an intermediate frequency substantially less than said central frequency but higher than the frequencies of signals to be transmitted to provide a resultant frequency-modulated wave characterized by a spectrum comprising a number of equally spaced components of similar amplitudes and of interference-minimizing phases, and simultaneously individually modulating components of said spectrum by signals of lower frequency.

6. The method of signalling which comprises the steps of generating oscillations of a central high frequency, generating oscillations of sawtooth wave form and of intermediate frequency, frequency-modulating the first oscillations by the second oscillations to provide a resultant frequency-modulated wave characterized by a spectrum comprising a number of equally spaced components of similar amplitudes and of interference-minimizing phases, isolating said components from each other, and simultaneously individually modulating components of said spectrum as so isolated by signals of lower frequency.

7. The method of signalling which comprises the steps of generating oscillations of substantially constant amplitude and of a high frequency which varies linearly with time, said variation recurring periodically at an intermediate frequency, resolving said oscillations into a plurality of spectral components, and simultaneously individually modulating at least some of said components by signals of lower frequency.

8. The method of signalling which comprises the steps of generating oscillations of substantially constant amplitude and of a high frequency which varies, linearly with time, said variation recurring periodically at an intermediate frequency, said oscillations being characterized by a spectrum comprising a number of equally spaced components of similar amplitudes and of interference-minimizing phases, and simultaneously individually modulating the several components of said spectrum by signals of lower frequency.

9. The method of signalling which comprises the steps of generating oscillations of a central high frequency, generating oscillations of non-sinusoidal wave form and of intermediate frequency, frequency-modulating the first oscillations by the second oscillations, the wave form of the non-sinusoidal oscillations being such as to provide a resultant frequency-modulated wave characterized by a spectrum composed of a plurality of parts, the several parts being centered respectively on the central high frequency and its harmonics, each part comprising a number of equally spaced components of similar amplitudes and of interference-minimizing phases, and simultaneously individually modulating the several components of said spectrum by signals of lower frequency.

10. The method of simultaneously generating a plurality of carriers for signal transmission, which carriers are equally spaced on the frequency scale, of similar amplitudes and of interference-minimizing phases, which comprises the steps of generating oscillations of a central high frequency, generating oscillations of sawtooth wave form and of frequency intermediate between said central high frequency and the frequencies of signals to be transmitted, frequency-modulating the first oscillations by the second oscillations, and resolving the resulting frequency-modulated wave into its spectral components.

11. The method of simultaneously generating a plurality of carriers for signal transmission, which carriers are equally spaced on the frequency scale, of similar amplitudes and of interference-minimizing phases, which comprises the steps of generating oscillations of a central high frequency, generating oscillations of sawtooth wave form and of frequency intermediate between said central high frequency and the frequencies of signals to be transmitted, frequency-modulating the first oscillations by the second oscillations to provide a resultant frequency-modulated wave characterized by a spectrum comprising a number of components, and isolating said components from each other.

12. The combination which comprises a source of oscillations of a central high frequency, a source of oscillations of intermediate frequency and of sawtooth wave form, a modulator fed by said sources and adapted to deliver a wave of substantially constant amplitude, whose frequency periodically varies substantially linearly between two values equally spaced about the central frequency, said wave being characterized by a spectrum comprising a number of equally spaced components of similar amplitudes and of interference-minimizing phases, a bank of band-pass filters fed by said modulator, each filter of said bank being tuned to pass one of said components, a lower frequency signal source associated with each filter, and a signal modulator fed by each of said signal sources and by the filter with which it is associated.

13. The combination which comprises a source of oscillations of a central high frequency, a source of oscillations of intermediate frequency and of sawtooth wave form, a modulator fed by said sources and adapted to deliver a wave of substantially constant amplitude, whose frequency periodically varies substantially linearly between two values equally spaced about the central frequency, said wave being characterized by a spectrum comprising a number of equally spaced components of similar amplitudes and of interference-minimizing phases, a plurality of lower frequency signal sources, means for modulating each of said components by one of said sources, and means for transmitting said components as so modulated over a common transmission medium.

14. The combination which comprises a source of a central high frequency, a source of intermediate frequency and of sawtooth wave form, a modulator fed by said sources and adapted to deliver a wave of substantially constant amplitude, whose frequency periodically varies in substantially linear fashion between two values equally spaced about the central frequency, said wave being characterized by a spectrum comprising a number of equally spaced components of similar amplitudes and of interference-minimizing phases, a plurality of lower frequency signal sources, and means for modulating each of said components by the signal of one of said sources.

15. The combination which comprises means for generating a wave of substantially constant amplitude and of frequency which varies periodically in substantially linear fashion between two values equally spaced about the central frequency, said variation recurring at an intermediate frequency, said wave being characterized by a spectrum comprising a number of equally spaced components of similar amplitudes and of interference-minimizing phases, a bank of band-pass filters fed by said modulator, each filter of said bank being tuned to pass one of said components, a lower frequency signal source associated with each filter, a signal modulator fed by each of said signal sources and by the filter with which it is associated, a common transmission medium, and means for transmitting said components as so modulated over said medium.

16. The combination which comprises a source of a central high frequency, a source of intermediate frequency and of sawtooth wave form, a modulator fed by said sources and adapted to deliver a wave of substantially constant amplitude, whose frequency periodically varies substantially linearly between two values equally spaced about the central frequency, said wave being characterized by a spectrum comprising a number of equally spaced components of similar amplitudes and of interference-minimizing phases, means for isolating said components from each other, means for individually signal-modulating said components, and means for transmitting said components together to a receiver station.

17. The combination which comprises a source of a central high frequency, a source of intermediate frequency and of sawtooth wave form, a modulator fed by said sources and adapted to deliver a wave of substantially constant amplitude, whose frequency periodically varies substantially linearly from a value below the central frequency to a value above it, said wave being characterized by a spectrum having a central part comprising a number of equally spaced components of substantially like amplitudes and having parts located above and below said central part on the frequency scale of substantially less amplitudes, a bank of band-pass filters fed by said modulator, one filter of said bank being tuned to pass each of the components of said central part, a lower frequency signal source associated with each of two adjacent filters of said bank, and a signal modulator fed by each of said signal sources and by the filter with which it is associated.

18. The combination which comprises means for generating a wave of substantially constant amplitude and of a frequency which varies periodically in substantially linear fashion between a value below the central frequency and another value above it, said variation recurring at an intermediate frequency, said wave being characterized by a spectrum comprising a number of equally spaced components of substantially like amplitudes and of interference-minimizing phases, a bank of band-pass filters fed by said modulator, each filter of said bank being tuned to pass one of said components, a signal source associated with each filter, and a signal modulator fed by each of said signal sources and by the filter with which it is associated.

19. The combination which comprises a first source of a central high frequency wave of substantially constant amplitude, a second source of an intermediate frequency wave of sawtooth wave form, a frequency modulator fed by said first source as wave to be modulated and by said second source as modulating wave, whereby said frequency modulator delivers a wave of substantially constant amplitude, whose frequency periodically varies substantially linearly between two values equally spaced about the central frequency, said wave being characterized by a spectrum comprising a number of equally spaced components of substantially like amplitudes and of interference-minimizing phases, a bank of band-pass filters fed by said modulator, each filter of said bank being tuned to pass one of said components, a lower frequency signal source associated with each filter, and a signal modulator fed by each of said signal sources and by the filter with which it is associated.

20. The combination which comprises a first source of a central high frequency wave, a second source of an intermediate frequency wave of sawtooth wave form, a frequency modulator fed by said first source as wave to be modulated and by said second source as modulating wave, a bank of band-pass filters fed by said modulator, a lower frequency signal source associated with each filter, and a signal modulator fed by each of said signal sources and by the filter with which it is associated.

21. The combination which comprises a source of a central high frequency, a source of intermediate frequency and of non-sinusoidal wave form, a modulator fed by said sources and adapted to deliver a wave of substantially constant amplitude and of varying frequency, the wave form of the non-sinusoidal oscillations being such that the resulting frequency modulated wave is characterized by a spectrum composed of a plurality of parts, the several parts being centered respectively on the central frequency and its harmonics, each part comprising a number of equally spaced components of similar amplitudes and of interference-minimizing phases, a bank of band-pass filters fed by said modulator, each filter of said bank being tuned to pass one of said components, a lower frequency signal source associated with each filter, and a signal modulator fed by each of said signal sources and by the filter with which it is associated.

22. The combination which comprises a source of a central high frequency, a source of frequency intermediate between said central high frequency and the frequency of a signal to be transmitted and of sawtooth wave form, a modulator fed by said sources and adapted to deliver a wave of substantially constant ampltiude, whose frequency periodically varies substantially linearly between two values equally spaced about the central frequency, said wave being characterized by a spectrum comprising a number of equally spaced steady components of substantially like amplitudes and of interference-minimizing phases, and means for isolating said components from each other.

23. The combination which comprises a source of a central high frequency, a source of frequency intermediate between said central high frequency and the frequency of a signal to be transmitted and of sawtooth wave form, a modlator fed by said sources and adapted to deliver a wave of substantially constant amplitude, whose frequency periodically varies substantially linearly between two values equally spaced about the central frequency, said wave being characterized by a spectrum comprising a number of equally spaced, steady components of substantially like amplitudes and of interference-minimizing phases, and a bank of band-pass filters fed by said modulator, each filter of said bank being tuned to pass one of said components.

24. The method of simultaneously transmitting a plurality of independent voice signals over a common medium without mutual interference which comprises the steps of generating sinusoidal, constant amplitude oscillations of a central high frequency, generating oscillations of sawtooth voltage wave form and of an intermediate frequency which exceeds the highest voice frequency to be transmitted, modulating the frequency of the first oscillations in proportion to the voltage of the second oscillations while leaving the amplitude of the first oscillations unchanged, to provide a resultant frequency-modulated wave characterized by a spectrum comprising a set of steady, sinusoidal, constant-frequency harmonic components of substantially like amplitudes and of interference-minimizing phases, which components are equally spaced apart on the frequency scale by the amount of said intermediate frequency, mutually isolating the several components of said set, and individually modulating each of said isolated components by a single one of said plurality of independent voice signals.

WILLIAM R. BENNETT.
CARL B. H. FELDMAN.

REFERENCES CITED

The following references are of record in the file of this patent:

UNITED STATES PATENTS

| Number | Name | Date |
|---|---|---|
| 1,956,397 | Nicolson | Apr. 24, 1934 |
| 2,144,380 | Parker | Jan. 17, 1939 |
| 2,188,500 | Curtis | Jan. 30, 1940 |
| 2,287,925 | White | June 30, 1942 |
| 2,371,988 | Granqvist | Mar. 20, 1945 |
| 2,408,692 | Shore | Oct. 1, 1946 |
| 2,433,343 | Chatterjea et al. | Dec. 20, 1947 |
| 2,444,928 | Harrison | July 13, 1948 |
| 2,445,618 | Hutcheson | July 20, 1948 |

FOREIGN PATENTS

| Number | Country | Date |
|---|---|---|
| 556,079 | Great Britain | Sept. 20, 1943 |